United States Patent Office 2,693,664
Patented Nov. 9, 1954

2,693,664

METHOD OF ENHANCING MUSHROOM MYCELIUM FLAVOR

Joseph Szuecs, Yonkers, N. Y.

No Drawing. Application August 20, 1949,
Serial No. 111,579

10 Claims. (Cl. 47—1.1)

This invention relates to a method of producing a mushroom mycelium product having enhanced mushroom flavor, and more particularly to a method of enhancing the mushroom flavor of mushroom mycelium prepared by submerged growth in a particulate form, by separating the freshly prepared mycelium from the nutrient medium, subjecting the mycelium to a chemical treatment, and then aging it until the characteristic mushroom flavor thereof is substantially enhanced.

The cultivation of edible mushrooms is a very complex procedure, involving the preparation of compost, maintenance of proper temperature conditions, the avoidance of contamination, and the like. Moreover, the procedure is rather lengthy, requiring an over-all time of 7 or 8 weeks or more, and this is reflected in the relatively high cost of edible mushrooms.

In accordance with the invention, it has been found that mushroom mycelium, which may be grown in a particulate form under submerged conditions in a commercially advantageous manner, may have its desirable characteristic mushroom flavor and taste substantially enhanced so that the resulting mushroom product is especially adapted as a food or mushroom flavoring material.

The objects achieved in accordance with the invention include the provision of an artificial edible mushroom product of substantially enhanced flavor and taste; the provision of methods of substantially enhancing the desirable mushroom flavor of particulate mushroom mycelium which has been cultivated under submerged aerobic conditions in a nutrient containing liquid substrate including organic material; the provision of methods of rapidly growing and preparing abundant quantities of mushroom mycelium having substantially enhanced mushroom flavor and taste at relatively low cost and from readily available substrate material; and other objects which will be apparent as details or embodiments of the invention are set forth hereinafter.

In order to facilitate a clear understanding of the invention, the following specific embodiments are set forth at the outset.

*Example 1*

With 100 parts by weight of a compact particulate mushroom mycelium material, separated from nutrient material and consisting of about 10% by weight solids and 90% by weight water, there is mixed 4 parts by weight of sodium chloride (solid). This mixture is allowed to age at about 4° C., whereby the characteristic mushroom flavor and taste thereof become considerably enhanced. The improvement in flavor is very noticeable even at an aging time of one day, and it continues to increase rapidly for about 4 days, after which the increase is less rapid. Generally, the substantially maximum enhanced flavor is attained in about 8 days aging.

This product is especially desirable for preparing mushroom essence, or soups and sauces; or it may be blended with cheese or meat or the like material in a food product.

The compact particulate mushroom mycelium starting material may be prepared in a commercially feasible manner, e. g., as follows:

In a 1.5 gallon glass container provided with a sintered glass air distributing plate at the bottom, there is placed 1 gallon of the following nutrient-containing liquid medium under strictly sterile conditions:

12.0 grams yeast extract (dry)
120.0 grams corn syrup 42° Bé.
16.0 grams $NH_4NO_3$
21.6 grams $KH_2PO_4$
4.9 grams $MgSO_4.7H_2O$
6.9 grams $K_2SO_4$
1.28 grams $CaCl_2.2H_2O$
0.008 grams $FeSO_4.7H_2O$
0.08 grams $MnSO_4.4H_2O$ diluted with water to 1 gallon, and adjusted to a pH of 7 with Normal NaOH solution.

The solution is gently agitated with a propeller type stirrer, rotating at about 300 R. P. M. to keep the mycelium suspended in the liquid medium, aerated from below at the rate of 160 cc. of air per minute through the sintered glass air distributor, and maintained at a temperature of about 25° C. It is then inoculated with 200 cc. of densely grown mycelium of *Psalliota campestris* grown and suspended in liquid substrate. Under these conditions, the mycelium grows in compact, particulate form and completely fills the container in about 6 days.

Alternatively, it may be prepared following the above procedure except using only 60.0 grams of the corn syrup, and adding 60 grams of conventional Cream-of-Wheat cereal; a similar growth of product is obtained in 6 days. The Cream-of-Wheat serves as a supporting material for the mycelium, and is partly or entirely consumed by the mycelium. The presence of such a support in the liquid medium seems to favor compact growth of the mycelium particles. In like manner, starch, wheat, or other cereal flour, or the like may be used as support material with equally satisfactory results.

Alternatively, it may be prepared according to the above procedure except that 60 grams of corn steep liquor is used instead of the yeast extract; a similar growth of product is obtained in 6 days.

In another alternative, it may be prepared according to the above procedure except that 24 grams of homogenized lecithin (made up into an aqueous emulsion) is added; a similar growth of product is obtained in 6 days. This product has a particularly intense flavor and taste. In like manner, an intensely flavored product is obtained by using an emulsion of an edible fat or oil in place of the lecithin.

Instead of inoculating with suspended mycelium, spores or pregerminated spores may be used. A part of the harvest from one growth may be used to inoculate the medium for a second growth, breaking each particulate into smaller pieces if desired. This permits growing mycelium in a substantially continuous manner, recovering half or more of the product, and using the remaining product to inoculate fresh sterile medium, which may be added in the same vessel. In this way, the growth time may be cut down to only about 2 days per charge.

The resulting mycelium material is separated from the liquid, e. g., by means of a centrifuge, or a Buchner funnel, and washed. It may be caviar-like or pearl-like pellets in appearance, or it may consist of larger lump- or ball-like masses of mycelium. The solids content thereof may be in the range of about 5 to 25% by weight, or more.

Preferably the growth is conducted at atmospheric pressure; however, other pressures may be used. The temperatures used are those at which the mycelium inoculum is accustomed to growing, and generally will lie within the range of 10° to 35° C. Lower temperatures may be used, providing the growth of the mycelium is not too slow. Higher temperatures may be used up to the temperatures at which the mycelium is killed or destroyed.

The aerobic conditions of growth are maintained by suitable gentle and efficient agitation, or by passing air or other oxygen-containing gases through the medium, or both. Generally, from about 0.01 to about 0.04 volumes of well dispersed air per minute will be passed per volume of the mixture of substrate and mycelium. A higher rate of flow may be used, but this is not required since no apparent advantage will be obtained thereby. A lower rate of air flow may be used, providing there is supplied to the growing mycelium the oxygen required in its normal growth processes and there is sufficient air flow to maintain the carbon dioxide concentration below that which will destroy the growing organism.

The exact composition of the nutrient substrate may vary over a considerable range, as the art will appreciate, but desirably should contain a carbohydrate as a principal component and should contain the usual mineral nutrient materials, i. e., nutrient compounds of K, Mg, Fe, Ca, P and S. Typical suitable carbohydrate or the like materials are hydrolyzed starch, maltose, glucose, xylose, sucrose, carboxymethylcellulose, and the like.

The nitrogen may be supplied by ammonium salts, urea, amino acids, proteins such as casein, albumin, peptone, cottonseed meal, peanut meal, coconut meal, soybean meal, wheat bran, or their hydrolysates.

The substrate is maintained at a pH at which the mycelium is accustomed to growing, and generally this will be in the range of 6.0 to 8.0. The total concentration of dissolved material in the solution is preferably in the range of about 0.1 to about 0.25 molar. Higher concentrations may be used, especially if the mycelium is adapted ("educated") for such concentrations. Lower concentrations may be used but are not desirable for economic reasons.

The above procedures make possible the growing of other edible mushrooms, e. g., the *Psalliota rodmani*, *Psalliota fabaceus*, *Pleurotus ostreatus*, *Polyporus umbellatus*, *Cantharellus cibarius*, *Clavaria stricta*, *Tricholoma rutilans*, *Morchella esculenta*, *Morchella bispora*, *Gyromitra esculenta*, and *Helvella elastica*.

*Example 2*

With 100 parts by weight of a compact particulate mushroom product, separated from nutrient material and consisting of about 20% by weight solids and 80% by weight water, there is mixed 3 parts by weight of sodium chloride (solid). This mixture is allowed to age at about 4° C., and the characteristic mushroom flavor and taste thereof become considerably enhanced. The improvement in flavor is very noticeable even at an aging time of one day, and it continues to increase rapidly for about 4 days, after which the increase is less rapid. Generally, the substantially maximum enhanced flavor is attained in about 8 days aging.

The product is also especially desirable for preparing mushroom essence, or soups and sauces; or it may be blended with cheese or meat or the like material in a food product.

The compact particulate mushroom mycelium starting material may be prepared as described above, with centrifuging or suction filtering of the mycelium to the indicated solids content.

The treatment with the sodium chloride is a preferred method of treating the mycelium prior to aging. The amount of the salt is desirably at least 2% based on the total weight of the mycelium, and preferably 4%. An amount up to 25% salt may be used, but generally the amount will be selected so as not to exceed the sodium chloride content wanted in the final food product prepared from the mushroom mycelium, e. g., soup or the like. The solid form of the salt is very convenient, but a concentrated aqueous solution may be used if desired.

In place of sodium chloride, other equivalent edible salt or other materials may be used to destroy the normal metabolic and reproduction powers of the mushroom mycelium.

For the purposes of the invention, sterilization by heating at an elevated temperature such as 60° to 80° C. would not be operative, since this destroys the flavor enhancing powers of the mycelium. A sample of mushroom mycelium treated with sodium chloride in accordance with the invention will not grow when placed in a sterilized nutrient medium; however, this treatment does not destroy the flavor enhancing powers which may be associated with the enzymatic reactivity thereof. Heat sterilized mushroom mycelium does not undergo the enhancement in flavor upon aging.

The flavor enhancing process may be carried out in the presence of air or under anaerobic conditions, since the process is anaerobic. When the aging process is carried out in the presence of air, e. g., in a quart Mason jar, the upper surface becomes darkened for a depth of about 1 mm. This does not adversely affect the flavor, and the darkened material may be mixed in with the bulk of the material in the jar, or it may be separated before use.

A commercially desirable property of the new enhanced flavor mushroom mycelium product of the invention is that it does not acquire a so-called "off-taste" upon standing. Therefore, it is well suited for handling in ordinary commerce, e. g., shipping, storing, marketing, etc.

This application is a continuation-in-part of my pending application Serial No. 21,845, filed April 19, 1948.

The above specific illustrations are for illustrative purposes only and are not to be regarded as necessary limitations of the invention, which includes variations and modifications which will be apparent to those skilled in the art, except as do not come within the scope of the appended claims.

I claim:

1. A process of treating an edible mushroom mycelium substantially freed of nutrient material and having characteristic mushroom flavor and taste, which process comprises treating said mycelium with 2 to 25% sodium chloride based on the total weight of the mycelium, and then aging the mycelium to substantially enhance the characteristic mushroom flavor and taste thereof.

2. A process of treating an edible mushroom mycelium substantially freed of nutrient material and having characteristic mushroom flavor and taste, which process comprises treating said mycelium with 4 parts by weight of sodium chloride for 100 parts total weight of mycelium having 10% solids content, and then aging the mycelium to substantially enhance the characteristic mushroom flavor and taste thereof.

3. A process of treating an edible mushroom mycelium substantially freed of nutrient material and having characteristic mushroom flavor and taste, which process comprises treating said mycelium with 4 parts by weight of sodium chloride for 100 parts total weight of mycelium having 20% solids content, and then aging the mycelium to substantially enhance the characteristic mushroom flavor and taste thereof.

4. A process of treating an edible mushroom mycelium having characteristic mushroom flavor and taste and obtained by inoculating with edible mushroom inoculum an aqueous nutrient-containing solution including organic material and provided with an edible particulate support material, and aerating the solution and maintaining the inoculum and the support material suspended therein by gentle agitation, thereby cultivating the mushroom mycelium on and around the support material in a submerged state, and separating the nutrient material therefrom to give a product having at least 10% by weight solids content, which process comprises treating said mycelium with 2 to 25% sodium chloride based on the total weight of the mycelium, and then aging the mycelium to substantially enhance the characteristic mushroom flavor and taste thereof.

5. A process of treating an edible mushroom mycelium having characteristic mushroom flavor and taste and obtained by inoculating with edible mushroom inoculum an aqueous nutrient-containing solution including organic material and provided with an edible organic particulate support material, and aerating and gently but efficiently agitating the solution to maintain the inoculum and the support material suspended therein, thereby cultivating the mushroom mycelium on and around the support material in a submerged state, said aqueous medium including a potassium hydrophosphate in excess of about 5.0 grams per quart of medium therein, and separating the nutrient material therefrom to give a product having at least 10% by weight solids content, which process comprises treating said mycelium with 2 to 25% sodium chloride based on the total weight of the mycelium, and then aging the mycelium to substantially enhance the characteristic mushroom flavor and taste thereof.

6. A process of treating an edible mushroom mycelium having characteristic mushroom flavor and taste and obtained by inoculating with edible mushroom inoculum an aqueous nutrient-containing solution including organic material and provided with an edible particulate nutrient support material suspended in the solution, and aerating and gently but efficiently agitating the solution to maintain the inoculum and the support material suspended therein, thereby cultivating the mushroom mycelium on and around the support material in a submerged state, said nutrient support material being at least partially consumed by the mushroom mycelium, and separating the nutrient material therefrom to give a product having at least 10% by weight solids content, which process comprises treating said mycelium with 2 to 25% sodium chloride based on the total weight of the mycelium, and then aging the mycelium to substantially enhance the characteristic mushroom flavor and taste thereof.

7. A process of treating an edible mushroom mycelium having characteristic mushroom flavor and taste and obtained by inoculating with edible mushroom inoculum an aqueous nutrient-containing solution including organic material and provided with an edible organic particulate nutrient support material, and aerating and gently but efficiently agitating the solution to maintain the inoculum and the support material suspended therein, thereby cultivating the mushroom mycelium on and around the support material in a submerged state, said aqueous medium having a pH in the range of about 6.0 to 8.0 throughout the growth period, and separating the nutrient material therefrom to give a product having at least 10% by weight solids content, which process comprises treating said mycelium with 2 to 25% sodium chloride based on the total weight of the mycelium, and then aging the mycelium to substantially enhance the characteristic mushroom flavor and taste thereof.

8. A process of treating an edible mushroom mycelium having characteristic mushroom flavor and taste and obtained by inoculating with edible mushroom inoculum an aqueous nutrient-containing solution including organic material and provided with an edible organic particulate nutrient support material suspended in the solution, and aerating and gently but efficiently agitating the solution to maintain the inoculum and the support material suspended therein, thereby cultivating the mushroom mycelium on and around the support material in a submerged state, said aqueous medium including potassium hydrophosphate in excess of about 5.0 grams per quart of medium therein and having a pH range of about 6.0 to 8.0 during the growth period and said nutrient support material being partially consumed by the mushroom mycelium, and separating the nutrient material therefrom to give a product having at least 10% by weight solids content, which process comprises treating said mycelium with 2 to 25% sodium chloride based on the total weight of the mycelium, and then aging the mycelium to substantially enhance the characteristic mushroom flavor and taste thereof.

9. A process of treating an edible mushroom mycelium having characteristic mushroom flavor and taste, which process comprises chemically destroying the normal metabolic functions of the mycelium with an edible saline reagent but retaining the enzymatic reactivity thereof, and then aging the mycelium at a temperature substantially near but above 0° C. thereby substantially enhancing the characteristic mushroom flavor and taste thereof.

10. A process of treating an edible mushroom mycelium having characteristic mushroom flavor and taste, which process comprises chemically destroying the normal metabolic functions of the mycelium with an edible saline reagent but retaining the enzymatic reactivity thereof, and then aging the mycelium for a period of from one to eight days at a temperature of approximately 4° C. whereby the characteristic mushroom flavor and taste thereof is substantially enhanced.

References Cited in the file of this patent

UNITED STATES PATENTS

| Number | Name | Date |
|---|---|---|
| 2,044,861 | Sinden | June 23, 1936 |

OTHER REFERENCES

Cassell, "Dictionary of Cookery," published 1877, page 435.

Farmers' Bulletin 342, U. S. Dept. Agr. (1909), pp. 27, 28, 29.

Burkholder, "Morphogenesis of Fungus . . .," Am. J. Botany, vol. 32 (July 1945), pp. 424 through 431.